(12) United States Patent
Singh et al.

(10) Patent No.: US 9,053,732 B2
(45) Date of Patent: Jun. 9, 2015

(54) METHOD OF FABRICATING A PERPENDICULAR MAGNETIC RECORDING MEDIUM

(75) Inventors: Amarendra Kumar Singh, Singapore (SG); Shun Matsumoto, Singapore (SG); Xiao Dong Chen, Singapore (SG); Hiroshi Kanazawa, Singapore (SG)

(73) Assignee: Showa Denko HD Singapore Pte Ltd., Singapore (SG)

( * ) Notice: Subject to any disclaimer, the term of this patent is extended or adjusted under 35 U.S.C. 154(b) by 142 days.

(21) Appl. No.: 13/344,867

(22) Filed: Jan. 6, 2012

(65) Prior Publication Data

US 2012/0231298 A1    Sep. 13, 2012

(30) Foreign Application Priority Data

Jan. 7, 2011  (SG) ................. 201100141-9

(51) Int. Cl.
| | | |
|---|---|---|
| *B05D 5/12* | (2006.01) | |
| *G11B 5/667* | (2006.01) | |
| *G11B 5/73* | (2006.01) | |
| *G11B 5/84* | (2006.01) | |
| *H01F 10/32* | (2006.01) | |

(52) U.S. Cl.
CPC .............. *G11B 5/667* (2013.01); *G11B 5/7325* (2013.01); *G11B 5/8404* (2013.01); *H01F 10/3272* (2013.01)

(58) Field of Classification Search
CPC .... G11B 5/667; G11B 5/2657; G11B 5/3932; G11B 5/399; G11B 5/7325; G11B 5/8404; B01J 19/08; B32B 15/00; H01F 10/3272
See application file for complete search history.

(56) References Cited

U.S. PATENT DOCUMENTS

| | | | | |
|---|---|---|---|---|
| 6,818,330 | B2 * | 11/2004 | Shukh et al. ................. | 428/828 |
| 2003/0017362 | A1 * | 1/2003 | Minor et al. ................. | 428/692 |
| 2010/0007989 | A1 * | 1/2010 | Xu et al. ...................... | 360/131 |
| 2010/0247964 | A1 | 9/2010 | Onoue et al. | |

FOREIGN PATENT DOCUMENTS

| | | |
|---|---|---|
| JP | 62-212934 A | 9/1987 |
| JP | 5-258272 A | 10/1993 |

\* cited by examiner

*Primary Examiner* — Michael Wieczorek
*Assistant Examiner* — Sarah R Anderson
(74) *Attorney, Agent, or Firm* — Sughrue Mion, PLLC

(57) ABSTRACT

A method of forming a perpendicular magnetic recording medium. The perpendicular magnetic recording medium comprises a substrate, an underlayer on the substrate, an intermediate layer on the underlayer and a recording layer on the intermediate layer. The underlayer comprises a first soft underlayer, an antiferromagnetically coupled Ru layer on the first soft underlayer, a second soft underlayer on the antiferromagnetically coupled Ru layer, and an orientation control layer on the second soft underlayer, the method comprises applying a negative bias voltage to the substrate during formation of the underlayer.

6 Claims, 4 Drawing Sheets

METHOD OF FABRICATING A PERPENDICULAR MAGNETIC RECORDING MEDIUM

TECHNICAL FIELD

The present application relates generally to a method of fabricating a perpendicular magnetic recording medium and has particular utility in hard disks utilizing perpendicular magnetic recording layers.

BACKGROUND

Perpendicular magnetic recording media are being increasingly used for various applications in consumer electronics and in particular hard disks. In contrast to traditional longitudinal magnetic recording media, where the magnetic orientation of individual magnetic domains is generally parallel to the surface of the medium, perpendicular magnetic recording media have magnetic orientation of individual magnetic domains perpendicular to the surface of the medium. This allows for a much higher storage density than have been achieved in longitudinal magnetic recording media.

To meet the industry requirement for ever-increasing amounts of data storage in a given amount of hard disk area (also known as 'areal density'), continuous improvement in the arrangement of perpendicular magnetic recording media is needed. One technique in which to achieve higher areal density is to reduce the grain size of the magnetic recording media. However, applying this technique to perpendicular recording media results in a poor switching field distribution $dH_c/H_c$ and poor crystal orientation $\Delta\theta_{50}$. This in turn results in higher media noise, which cancels any improvement in signal-to-noise ratio (SNR) obtained by using smaller grains.

SUMMARY OF THE INVENTION

A perpendicular recording medium and method of fabricating the perpendicular recording medium are provided, in which application of a negative bias voltage to the substrate during formation of an underlayer in the perpendicular recording medium results in the perpendicular recording medium having generally smaller grains, better crystal $\Delta\theta_{50}$ orientation and improved switching field distribution $dH_c/H_c$.

According to a first exemplary aspect, there is provided a method of forming a perpendicular magnetic recording medium, the perpendicular magnetic recording medium comprising a substrate, an underlayer on the substrate, an intermediate layer on the underlayer and a recording layer on the intermediate layer, the underlayer comprising a first soft underlayer, an antiferromagnetically coupled Ru layer on the first soft underlayer, a second soft underlayer on the antiferromagnetically coupled Ru layer, and an orientation control layer on the second soft underlayer, the method comprising applying a negative bias voltage to the substrate during formation of the underlayer.

The negative bias voltage may be applied to the substrate during formation of at least one of: the first soft underlayer, the second soft underlayer and the orientation control layer.

The negative bias voltage may be applied to the substrate during formation of the first soft underlayer, and the method may further comprise removing the negative bias voltage during formation of a portion of the first soft underlayer adjacent the antiferromagnetically coupled Ru layer.

The portion of the first soft underlayer adjacent the antiferromagnetically coupled Ru layer may have a thickness of up to 10% of the thickness of the first soft underlayer.

The negative bias voltage may be applied to the substrate during formation of the second soft underlayer, and the method may further comprise removing the negative bias voltage during formation of a portion of the second soft underlayer adjacent the antiferromagnetically coupled Ru layer.

The portion of the second soft underlayer adjacent the antiferromagnetically coupled Ru layer may have a thickness of up to 10% of the thickness of the second soft underlayer.

The orientation control layer may comprise a first sub-layer and a second sub-layer, and the negative bias voltage may be applied to the substrate during formation of at least one of the first sub-layer and the second sub-layer.

The negative bias voltage applied may be up to 500V.

According to a second exemplary aspect, there is provided perpendicular magnetic recording medium fabricated by the method as described above.

The orientation control layer may have a face-centred cubic structure.

The orientation control layer may comprise a first sub-layer and a second sub-layer.

The first sub-layer may have an amorphous structure and the second sub-layer may have a face-centred cubic structure.

BRIEF DESCRIPTION OF THE FIGURES

Preferred embodiments will now be described with reference to the accompanying figures in which.

DETAILED DESCRIPTION OF PREFERRED EMBODIMENTS

Exemplary embodiments of a perpendicular recording medium 103 and a method 700 of fabrication of the exemplary embodiments will be described below with reference to FIGS. 1 to 7.

Figure 1:
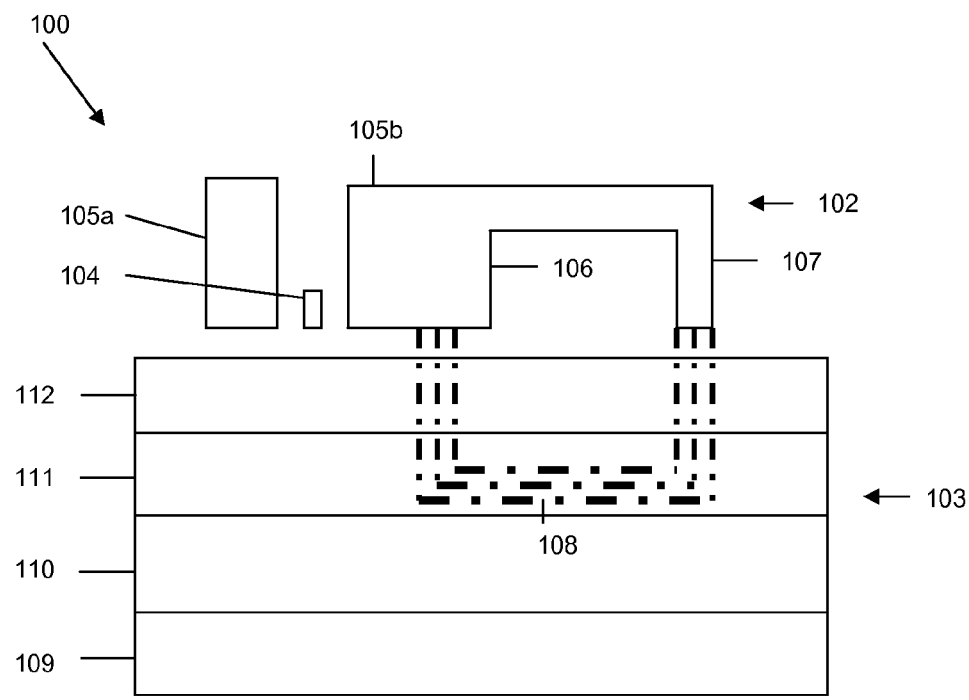
FIG. 1 is a schematic cross-section of a perpendicular recording head over a perpendicular recording medium.

As shown in FIG. 1, an exemplary perpendicular recording system 100 has a magnetic recording head (read-write device) 102 and a perpendicular recording medium 103. The magnetic recording head 102 has a reader unit consisting of a magnetoresistive sensor 104 flanked by shields 105a and 105b. The magnetic recording head 102 also has a writer unit consisting of a write pole 107 and a return pole 106. During a writing operation, write flux travels from the write pole 107 through a path 108 in the perpendicular recording medium 103 and returns to the return pole 106.

Figure 2:
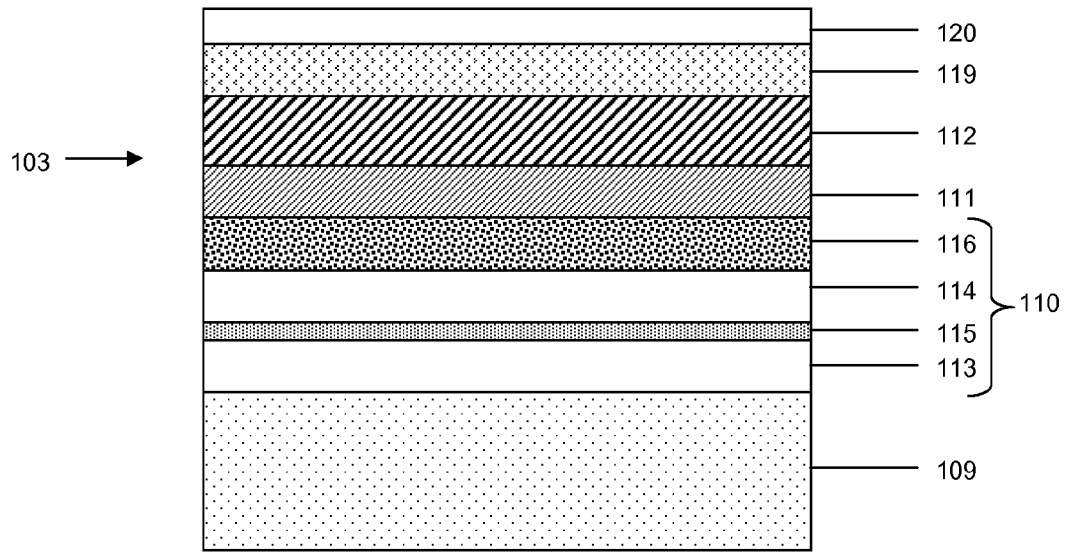
FIG. 2 is a schematic cross-section of a preferred form of the perpendicular recording medium.

The perpendicular recording medium 103 comprises a substrate 109, an underlayer 110, an intermediate layer 111 and a recording layer 112. An exemplary schematic cross-section (not to scale) of the structure of a preferred form perpendicular recording medium 103 is shown in FIG. 2. As can be seen, the underlayer 110 on the substrate 109 comprises a first soft underlayer 113 and a second soft underlayer 114 with a layer of antiferromagnetically coupled ruthenium ((AFC) Ru) 115 between the first and second soft underlayers 113, 114. The underlayer 110 also comprises an orientation control layer 116. The orientation control layer 116 is arranged on the second soft underlayer 114, with the intermediate layer 111 being arranged on the orientation control layer 116. The recording layer 112, a protective layer 119, and a lubricant layer 120 are formed subsequently on the intermediate layer 111.

The substrate 109 of the perpendicular recording medium 103 is made of aluminium (Al) or Al alloy in the preferred embodiment. Where necessary or desired, the substrate 109 may be made of materials such as glass, silicon, or silicon carbide instead. The average surface roughness of the substrate 109 in the preferred embodiment is not higher than 0.3 nm, and not less than 0.1 nm. For example, surface roughness between 0.2 nm and 0.1 nm is acceptable taking into account flyability of the recording head 102.

The first and second soft underlayers 113, 114 are formed of a soft magnetic material (i.e. a material that is easily magnetized and demagnetized). In the preferred embodiment, the soft magnetic material is cobalt alloy with either cobalt (Co) or iron (Fe) as the base alloy, and with one or more additives selected from the group consisting of: tantalum (Ta), niobium (Nb), zirconium (Zr), silicon (Si), boron (B), carbon (C), aluminium (Al), chromium (Cr). The additive is within the range of 0 to 20 at %. The first and second soft underlayers 113, 114 and the (AFC) Ru layer 115 together preferably have a total thickness of between 20 nm and 80 nm. The first and second soft underlayers 113, 114 have an amorphous structure. The advantage of having an amorphous structure is that it helps obtain better crystal orientation of grains in the perpendicular medium structure.

The orientation control layer 116 functions to control the grains, crystal growth and crystal orientation in the recording layer 112. The orientation control layer is preferably of a nickel (Ni) alloy, platinum (Pt), tantalum (Ta), or palladium (Pd) alloy. The thickness of the orientation control layer 116 is between 1 nm and 15 nm in the preferred embodiment. A thinner orientation control layer 116 may not provide the desired improved crystal growth and orientation of the grains in the recording layer 112, while a thicker orientation control layer 116 may result in an increase in the head-to-soft-underlayer spacing and therefore may undesirably decrease writeability. The orientation control layer 116 preferably has a face-centred cubic (fcc) structure.

In the preferred embodiments of the underlayer 110 as shown in FIGS. 3 to 6, a negative bias voltage may be applied to the substrate 109 during formation of one or both of the first and second soft underlayers 113, 114 as well as the orientation control layer 116. However, no bias voltage is applied during formation of a portion of either of the first and second soft underlayers 113n, 114n adjacent the (AFC) Ru layer 115.

Figure 3:
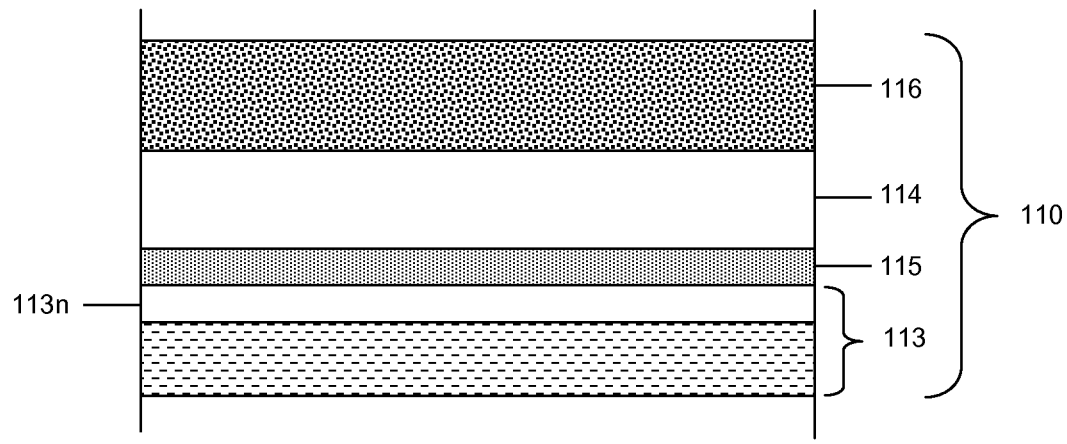
FIG. 3 is a schematic cross-section of the underlayer in a first embodiment.

FIG. 3 shows a first embodiment of the underlayer 110 in which a negative bias voltage was applied to the substrate 109 during formation of the first soft underlayer 113. The negative bias voltage was removed when forming a portion of the first soft underlayer 113n adjacent the (AFC) Ru layer 115. The portion 113n adjacent the (AFC) Ru layer 115 is up to 10% of the thickness of the first soft underlayer 113. No negative bias voltage was applied to the substrate during formation of the second soft underlayer 114.

Figure 4:
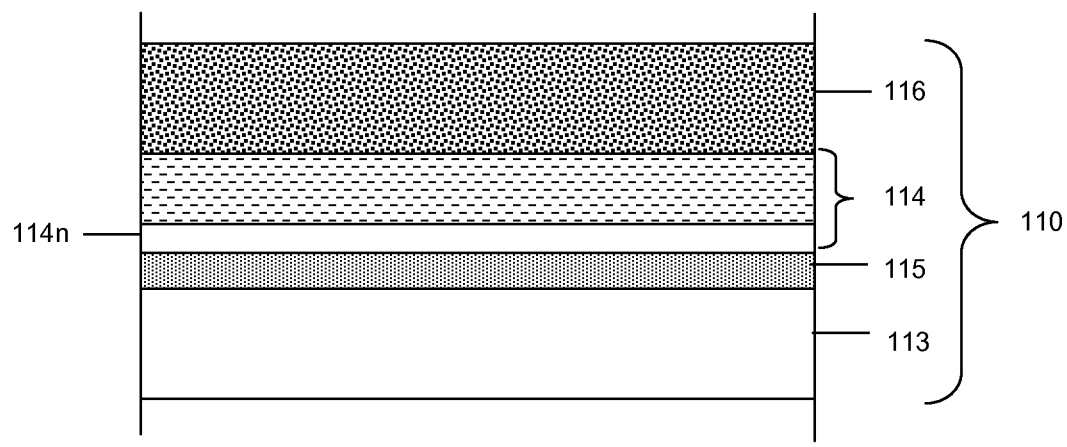
FIG. 4 is a schematic cross-section of the underlayer in a second embodiment.

FIG. 4 shows a second embodiment of the underlayer 110 in which a negative bias voltage was applied to the substrate 109 during formation of the second soft underlayer 114. The negative bias voltage was removed when forming a portion of the second soft underlayer 114n adjacent the (AFC) Ru layer 115. The portion 114n adjacent the (AFC) Ru layer 115 is up to 10% of the thickness of the first soft underlayer 114. No bias voltage was applied to the substrate during formation of the first soft underlayer 113.

Figure 5:
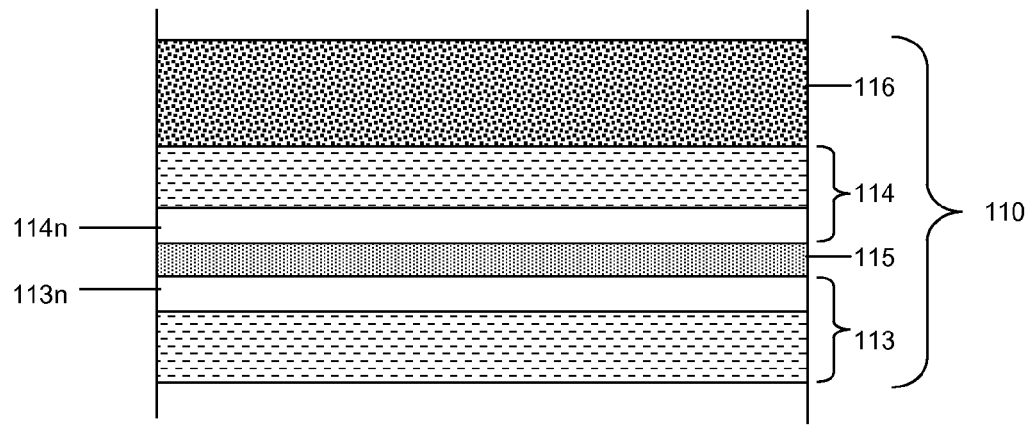
FIG. 5 is a schematic cross-section of the first underlayer in a third embodiment.

FIG. 5 shows a third embodiment of the underlayer 110 in which a negative bias voltage was applied to the substrate 109 during formation of the first soft underlayer 113. The negative bias voltage was removed when forming a portion of the first soft underlayer 113n adjacent the (AFC) Ru layer 115. A negative bias voltage was also applied to the substrate 109 during formation of the second soft underlayer 114. The negative bias voltage was removed when forming a portion of the second soft underlayer 114n adjacent the (AFC) Ru layer 115. The portions 113n, 114n adjacent the (AFC) Ru layer 115 are up to 10% of the thickness of the first and second soft underlayers 113, 114 respectively.

For the first, second and third embodiments shown in FIGS. 3 to 5, the orientation control layer 116 may be formed with or without simultaneous application of a negative bias voltage to the substrate 109.

Figure 6:
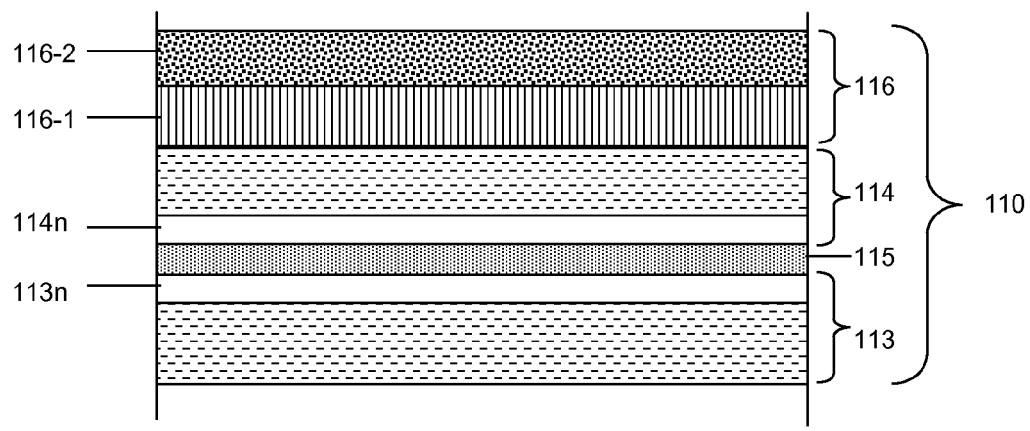
FIG. 6 is a schematic cross-section of the first underlayer in a fourth embodiment.

FIG. 6 shows a fourth embodiment of the underlayer 110 in which the first and second soft underlayers 113, 114 are formed in the same way as that of the third embodiment shown in FIG. 5. However, in the fourth embodiment of FIG. 6, the orientation control layer 116 comprises a first sub-layer 116-1 and a second sub-layer 116-2. The first sub-layer 116-1 is arranged on the second soft underlayer 114. Formation of each of the first and second sub-layers 116-1, 116-2 may be performed with or without simultaneous application of a negative bias voltage to the substrate 109. Preferably, the first sub-layer 116-1 has an amorphous structure while the second sub-layer 116-2 has a fcc structure.

By applying a negative bias voltage of up to 500 V to the substrate 109 during formation of the underlayer 110, that is, during formation of one or more of the first soft underlayer 113, the second soft underlayer 114 and the orientation control layer 116, smaller grains with better Co c-axis orientation are obtained in the recording layer 112.

The intermediate layer 111 of the perpendicular recording medium 103 functions to control orientation of the grains of the recording layer 112, and to provide better segregation of grains in the recording layer 112. The intermediate layer 111 comprises Ru or a Ru-alloy. Other alloys may be used to decrease the grain size of the recording layer 112. The thickness of the intermediate layer 111 is between 10 nm and 30 nm.

The recording layer 112 comprises one or more of Co, Cr and Pt (preferably a Co-alloy) with an oxide, and has an easy axis orientation perpendicular to the film normal. The recording layer 112 also comprises the additives of B, Zr, W, Ti, Ta, Ru for further improvement in the SNR. The recording layer preferably comprises multiple granular recording layers, and an upper continuous recording layer. The thickness of the recording layer 112 is preferably between 20 nm and 70 nm to maintain sufficient signal output, SNR and overwrite characteristic.

The protective layer 119 functions to prevent damage to the surface of the perpendicular recording medium 103, and additionally helps to prevent corrosion. The protective layer 119 comprises one of the following materials: C, Ru, or $SiO_2$. The thickness of the preferred form protective layer 119 is between 1 nm and 5 nm.

The lubricant layer 120 comprises one of the following materials: perfluoropolyether, a fluorinated alcohol, tetraol, Z-dol, A20H.

Figure 7:
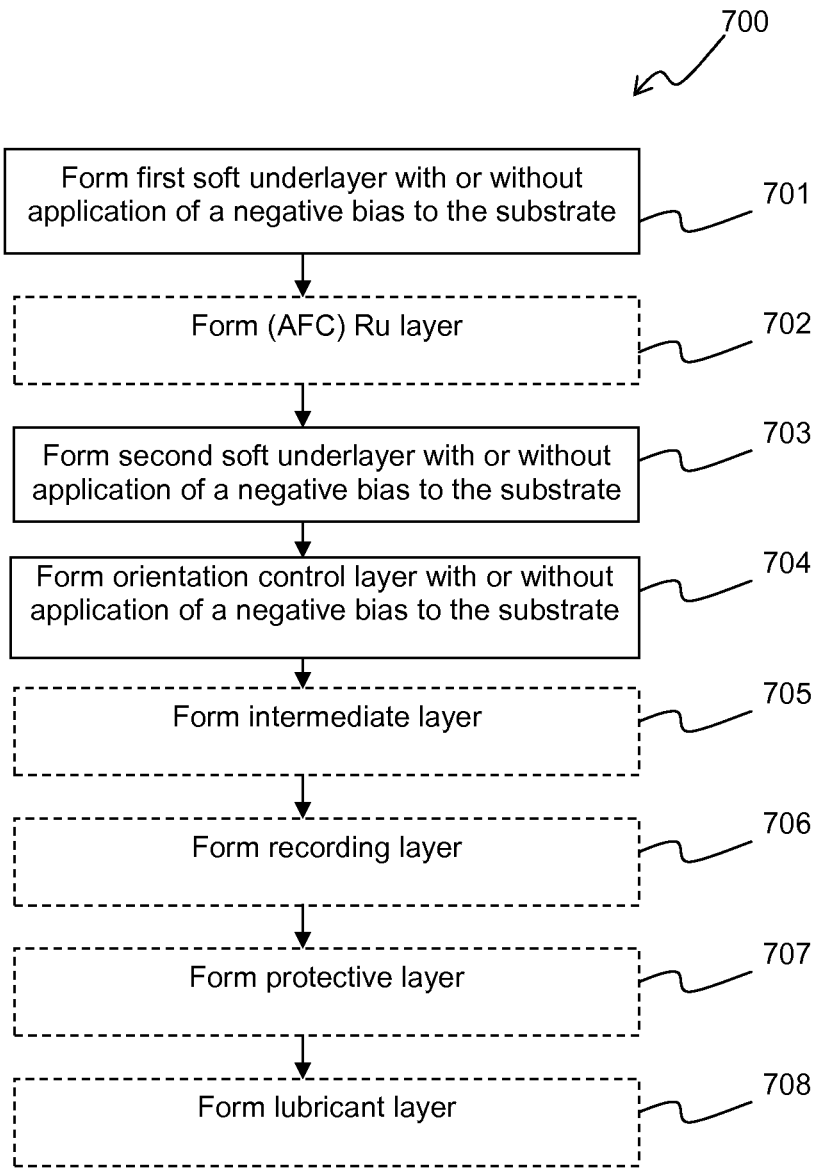
FIG. 7 is a flow chart of the preferred method of fabricating the perpendicular recording medium.

A preferred method 700 of fabricating the perpendicular recording medium will now be described with reference to the flow chart of FIG. 7. The steps relevant to the present invention are shown in solid boxes while steps not relevant to the present invention are shown in dashed boxes.

The method 700 begins with forming the first soft underlayer 113 on the substrate 109 (701), forming the (AFC) Ru layer 115 on the first soft underlayer 113 (702), and forming the second soft underlayer 114 on the (AFC) Ru layer 115 (703). A negative bias voltage is applied to the substrate 109 during formation of at least one of the first soft underlayer 113 and the second soft underlayer 114.

No bias voltage is applied to the substrate 109 when forming a portion 113n of the first soft underlayer 113 adjacent the (AFC) Ru layer 115 or when forming a portion 114n of the second soft underlayer 114 adjacent the (AFC) Ru layer 115. For example, if a negative bias voltage is applied to the substrate 109 during formation of the first soft underlayer 113, the negative bias voltage is removed during formation of the portion 113n of the first soft underlayer adjacent the (AFC) Ru layer 115. Similarly, if a negative bias voltage is applied to the substrate 109 during formation of the second soft underlayer 114, the negative bias voltage is removed during formation of the portion 114n of the second soft underlayer adjacent the (AFC) Ru layer 115.

The orientation control layer 116 is then formed on the second soft underlayer 114 (704). A negative bias voltage may also be applied to the substrate 109 during formation of at least a portion of the orientation control layer 116. For example, where the orientation control layer 116 comprises a first sub-layer 116-1 and a second sub-layer 116-2, the negative bias voltage may be applied to the substrate 109 during formation of at least one of the first sub-layer 116-1 and the second sub-layer 116-2.

After formation of the orientation control layer 116 (704), the intermediate layer 111 is formed on the orientation control layer 116 (705). The recording layer 112 is then formed on the intermediate layer 111 (706), followed by formation of the protective layer 119 on the recording layer 112 (707), and formation of the lubricant layer 120 on the protective layer 119 (708).

EXAMPLES

In the non-limiting examples described below, all of the layers of the perpendicular recording medium 103 were fabricated by DC magnetron sputtering (INTERVAC, 250 B) except for the protective layer 119, which was formed by chemical vapour deposition. The fabrication was performed in a vacuum chamber maintained at an internal vacuum level of $10^{-5}$ or less.

Four examples of different underlayers 110 were formed. Examples 1, 2, 3 and 4 comprised orientation control layers 116 with thicknesses of 8 nm, 6 nm, 4 nm and 2 nm respectively. The four examples were formed without application of any bias voltage to the substrates 109 during formation of the underlayers 110.

Four control examples were also formed comprising orientation control layers 116 with the same thicknesses of 8 nm, 6 nm, 4 nm and 2 nm. For each of the four comparative examples, a negative bias voltage was applied to the substrate 109 during formation of the underlayer 110 as described above.

Magnetic properties and switching field distribution ($dH_c/H_c$) were measured by P-KERR BH-810-CPC SD2 (Neork). Theta 2 theta and Co c-axis orientation were measured with a Rigaku X-Ray Diffractometer. Grain size was estimated with the Sheror equation based on in-plane theta-2theta measurement.

Table 1 below shows the resulting coercivity $H_c$, nucleation field $H_n$, grain size and Co c-axis orientation obtained for the four examples and comparative examples formed.

TABLE 1

| Example/ Comparative (Comp.) Example | Orientation control layer thickness (nm) | Negative bias voltage on during underlayer formation? | $dH_c/H_c$ | $H_c$ (Oe) | $H_n$ (Oe) | Grain Size (nm) | Co c-axis orientation ($\Delta\theta_{50}$) |
|---|---|---|---|---|---|---|---|
| 1 | 8 | No | 0.063 | 4854 | 2218 | 9.1 | 3.443 |
| 2 | 6 | No | 0.072 | 4733 | 2100 | 8.8 | 3.330 |
| 3 | 4 | No | 0.076 | 4546 | 1921 | 8.2 | 3.488 |
| 4 | 2 | No | 0.089 | 3990 | 1471 | 6.4 | 3.583 |
| Comp. 1 | 8 | Yes | 0.061 | 4994 | 2317 | 10.0 | 3.251 |
| Comp. 2 | 6 | Yes | 0.065 | 4857 | 2192 | 8.8 | 3.281 |
| Comp. 3 | 4 | Yes | 0.072 | 4677 | 2021 | 8.6 | 3.167 |
| Comp. 4 | 2 | Yes | 0.080 | 4165 | 1575 | 6.8 | 3.193 |

From the results, it can be seen that applying a negative bias voltage to the substrate 109 during formation of the underlayer 110 resulted in higher coercivity $H_c$, nucleation field $H_n$.

The switching field distribution ($dH_c/H_c$) and Co c-axis orientation were also improved with application of the negative bias voltage, as shown by the lowering of the $dH_c/H_c$ and $\Delta\theta_{50}$ values. In general, application of negative bias voltage or the bias process results in relatively smaller grains with better switching field distribution ($dH_c/H_c$) and $\Delta\theta_{50}$ values. Normally, smaller grain media have poor switching field distribution (dHc/Hc) and higher $\Delta\theta_{50}$. However, applying the bias process can result in better switching and Co c-axis orientation while retaining the overall smaller grains, although there is slight increase in grain size.

The foregoing describes preferred embodiments, which, as will be understood by those skilled in the art, may be subject to variations or modifications in design, construction or operation without departing from the scope of the claims.

The invention claimed is:

1. A method of forming a perpendicular magnetic recording medium, the perpendicular magnetic recording medium comprising a substrate, an underlayer on the substrate, an intermediate layer on the underlayer and a recording layer on the intermediate layer, the underlayer comprising a first soft underlayer, an antiferromagnetically coupled Ru layer on the first soft underlayer, a second soft underlayer on the antiferromagnetically coupled Ru layer, and an orientation control layer on the second soft underlayer, the method comprising applying a negative bias voltage to the substrate during formation of the underlayer, wherein the negative bias voltage is applied to the substrate during formation of one of: the first soft underlayer and the second soft underlayer, and further comprising removing the negative bias voltage during formation of a portion of the one of: the first soft underlayer and the second soft underlayer adjacent the antiferromagnetically coupled Ru layer.

2. The method of claim 1, wherein the negative bias voltage is applied to the substrate during formation of at least one of: the first soft underlayer, the second soft underlayer and the orientation control layer.

3. The method of claim 1, wherein the portion of the one of: the first soft underlayer and the second soft underlayer adjacent the antiferromagnetically coupled Ru layer has a thickness of up to 10% of the thickness of the one of: the first soft underlayer and the second soft underlayer.

4. The method of claim 1, wherein the orientation control layer comprises a first sub-layer and a second sub-layer, and the negative bias voltage is applied to the substrate during formation of at least one of the first sub-layer and the second sub-layer.

5. The method of claim 1, wherein the negative bias voltage applied is up to 500V.

6. The method of claim 1, wherein each of the first soft underlayer and the second soft underlayer are directly adjacent the antiferromagnetically coupled Ru layer.

* * * * *